March 30, 1965 G. VOSSELER 3,176,167

QUARTZ OSCILLATOR AND DRIVE SYSTEM

Filed Dec. 21, 1962

3,176,167
Patented Mar. 30, 1965

3,176,167

QUARTZ OSCILLATOR AND DRIVE SYSTEM

Gerhard Vosseler, Rosieres, Switzerland
(Steinentor Str. 25, Basel, Switzerland)

Filed Dec. 21, 1962, Ser. No. 246,564
Claims priority, application Switzerland, Jan. 5, 1962, 115/62
2 Claims. (Cl. 310—8.1)

Quartz-controlled time-pieces are already known which operate with crystal controlled oscillators of various types acting as time bases. These oscillators are however comparatively bulky by reason of the compound electric and electronic parts incorporated therewith. They serve consequently solely for large time-pieces, chiefly as standard time bases and cannot be used with small time-pieces such as wrist watches.

Now, my invention has for its object a crystal oscillator of a simple structure such that it may be incorporated with small-sized time-pieces.

My improved oscillator is an electromechanical resonator and includes at least one collecting member and one driving member inserted respectively in the input circuit and in the power circuit of an amplifier, preferably a transistor amplifier, and furthermore at least one of said members is constituted by a crystal the resonance frequency of which defines the time base of the time-piece, said two members being mechanically coupled when they oscillate at resonance frequency, whereby it is possible for the driving member to energize the collecting member.

The accompanying drawing illustrates, by way of example, a preferred embodiment of my invention together with a modification thereof. In said drawing.

Figure 1:
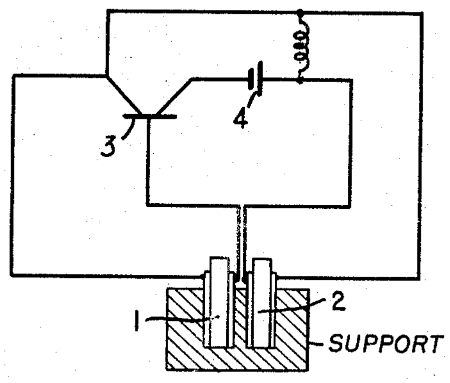
FIG. 1 is a diagrammatic view of said embodiment.

The oscillator illustrated in FIG. 1 forms a time base for a time-piece and it includes two quartz crystals 1 and 2, a transistor 3 and a supply of electrical energy 4. The crystal 1 is connected with the base-emitter-circuit of the transistor 3, and induces, if mechanically excited in a way explained in further detail below, because of piezoelectric effect voltage impulses in the base circuit of transistor 3. These voltage impulses render the transistor 3 periodically conductive. The second crystal 2 is connected in series with the direct-current source 4 in the emitter-collector-circuit of the transistor 3, and is coupled with crystal 1 in a purely mechanical way. For this purpose, both crystals 1 and 2 are clamped close to each other in a common support, the latter transmits the mechanical oscillation or movement of the one quartz to the other. Subsequent to a current impulse through the emitter-collector-circuit of the transistor 3, the crystal 2 is subjected to a mechanical deformation because of piezoelectric effect. This mechanical deformation is then mechanically transmitted to the other crystal 1, and induces thereby a voltage impulse in the control circuit of the transistor. Therefore, and in this way, the coupling back or feedback of the oscillator via the two crystals 1 and 2 is obtained in a purely mechanical way, with the two crystals acting at the same time the elements which determine the frequency of the oscillator.

Figure 2:
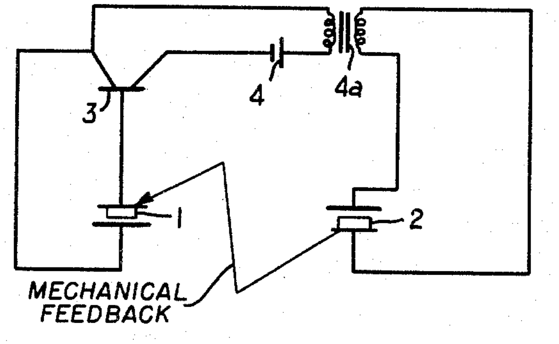
FIG. 2 illustrates a modification thereof.
Figure 3:
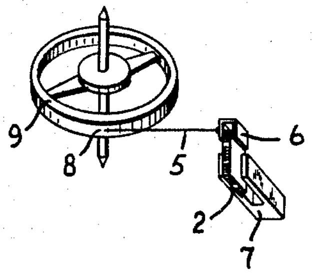
FIG. 3 shows a detail of the embodiment according to FIG. 1.

In the embodiment according to FIG. 2, the emitter-collector-circuit of the transistor 3 is coupled to the crystal 2 by a transformer 4*a* which allows a certain reduction in the frequencies of oscillation of one of said quartz crystals with reference to the other.

The driving system includes a thin rod 5, secured through the agency of a strap 6 to the driving crystal 2 which is in its turn fitted inside a carrier 7. The end 8 of said rod 5 engages under a predetermined pressure and along a predetermined angular setting the outer smooth periphery of a driving ratchet wheel 9 forming the first gear of the gearwork of the time-piece. When the oscillator reaches its resonance frequency, the quartz 2 vibrates and drives the rod 5 of which the end 8 assumes a corresponding axial movement, said movement urging the ratchet wheel forwardly and producing its intermittent progression.

The oscillator described hereinabove shows the well-known stability of quartz oscillators and it is in fact hardly sensitive to any change in position of the watch, modification in temperature and ageing. Its structure is simple and it is extremely cheap by reason of the absence of any conventional collecting and driving winding incorporated with all other electronic systems. Lastly, the absence of any condenser and resistance and also the possibility of resorting to small-sized quartz crystals allows executing arrangements of a restricted bulk, which may be readily used for wrist watches. Lastly, a quartz may be readily used as a driving member in the driving means resorted to, the advantages of which are considerable.

Of course, my invention is by no means limited to the arrangements described and illustrated and it is possible, for instance, to provide, within the scope of the accompanying claims, other electric circuits, amplifiers, or else, means for driving the gearing.

What I claim is:

1. An electric resonator for driving clocks and watches having a drive gear train comprising a drive gear, said resonator comprising a resonant circuit comprising a transistor having a base-emitter-circuit and an emitter-collector circuit, a first crystal oscillator connected in series with said base-emitter circuit, a second crystal oscillator in series with said emitter-collector circuit, a direct current source connected in said emitter-collector circuit, means mechanically coupling said first and second crystals for transmission of mechanical oscillations one to the other, and a mechanical pawl element connected to said second crystal vibratable therefrom for driving said drive gear.

2. An electromechanical resonator according to claim 1, including a transformer coupling said second crystal to said emitter collector circuit.

References Cited by the Examiner

UNITED STATES PATENTS

| | | | |
|---|---|---|---|
| 1,693,806 | 12/28 | Cody | 310—8.1 |
| 1,995,270 | 3/35 | Wallace | 310—8.6 |
| 2,908,174 | 10/59 | Hetzel | 58—23 |
| 2,921,252 | 1/60 | Schiavone | 310—8.1 |

MILTON O. HIRSHFIELD, *Primary Examiner.*